2,699,404

PROCESS FOR MAKING ELECTRICAL CONTACT BRUSHES CONTAINING CALCIUM CARBONATE

Dimiter Ramadanoff, Berea, Ohio, assignor to Union Carbide and Carbon Corporation, a corporation of New York No Drawing. Application August 1, 1952, Serial No. 302,245

3 Claims. (Cl. 117—61)

This invention relates to a process for making electrical contact brushes and in particular relates to a process for making electrical contact brushes containing calcium carbonate.

The operating properties of electrical contact brushes can be improved for certain purposes, according to the prior art, by impregnating conventional carbon or graphite brush stock with materials that will alter or provide a film on the surface of a commutator during the operation of electrical equipment. The inclusion of additives in carbon and graphite brushes has been particularly important in making brushes for use in motors and generators on airplanes wherein special commutating problems are encountered due to the atmospheric conditions prevailing at high altitudes.

Among the additives suggested for use in brushes, and the one with which the present process is concerned, is calcium carbonate. Calcium carbonate can be used alone or in combination with other additives to impart desirable operating properties to conventional carbon and graphite brushes.

It is the object of the present invention to provide a process for incorporating in a conventional carbon or graphite brush substantial quantities of calcium carbonate distributed uniformly throughout the brush.

The object of the invention is accomplished by introducing a solution of calcium nitrate, preferably an aqueous solution, into conventional carbonaceous brush stock, removing the solvent, and heating the brush to a temperature sufficient to effect a reaction between the calcium nitrate and the carbon in the brush to convert the calcium nitrate to calcium carbonate.

The distribution of calcium carbonate in brushes made according to the invention has been found to be uniform. In this respect it is interesting to note that many soluble calcium containing materials which can be converted to calcium carbonate in a brush tend to exude from the brush stock during processing. This exudation concentrates the calcium carbonate in the outer portions of the brush and often results in the formation of a crust of calcium carbonate on the outside of the brush. This crust must, of course, be removed before the brush will operate satisfactorily. None of these difficulties are encountered with the process of the invention.

An example of the preferred method of the invention follows: Carbonaceous brush stock, suitably of the shape and size desired in the finished brush, is placed in an air-tight chamber. Air is pumped out of the chamber until the pressure in the chamber is below atmospheric, and preferably, on the order of five to ten millimeters of mercury. An aqueous solution of calcium nitrate is fed into the evacuated chamber until the brush stock is immersed in the solution. The contents of the chamber are then exposed to at least atmospheric pressure. Because conventional carbonaceous brush stock is porous, some of the solution will be absorbed by the brush stock. The impregnated brush stock is then dried, as by heating to about 150° C., and fired at about 650° C. to convert the calcium nitrate to calcium carbonate.

The calcium nitrate solution can be introduced into the brush in other ways without departing from the scope of the invention. For example, certain quantities of a solution of calcium nitrate will be absorbed by brush stock which is merely immersed in the solution. These small quantities of calcium nitrate are satisfactory where only small amounts of calcium carbonate are desired in the finished brush. However, where large amounts of calcium carbonate are desired, the preferred impregnation technique described above is recommended.

The quantity of calcium nitrate and consequently the quantity of calcium carbonate which can be introduced into a brush according to the invention will depend upon the porosity of the brush stock and the concentration of the solution. In specific instances about 2.5% calcium carbonate, based on the weight of the brush stock, was introduced into an electrographitic brush stock using a solution of 50 grams of calcium nitrate tetrahydrate per 50 cubic centimeters of water. Over seven percent calcium carbonate was introduced into similar brush stock using a solution containing 400 grams of calcium nitrate tetrahydrate per 100 cubic centimeters of water. The tetrahydrate of calcium nitrate is preferred over other calcium nitrate salts because of its relatively great solubility.

The firing of the impregnated brush to convert the calcium nitrate to calcium carbonate is efficiently carried out at about 650° C. A temperature that is sufficiently high to bring about the reaction between the calcium nitrate and carbon is indicated by the evolution of brown nitrogen dioxide fumes from the impregnated brush stock.

What is claimed is:

1. A process for introducing calcium carbonate into conventional carbonaceous brush stock which comprises impregnating said brush stock with a solution of calcium nitrate, removing the solvent from said brush stock and converting the calcium nitrate to calcium carbonate by heating.

2. A process for introducing calcium carbonate into conventional carbonaceous brush stock which comprises impregnating said brush stock with an aqueous solution of calcium nitrate, drying said brush stock, and converting the calcium nitrate in said brush to calcium carbonate by heating.

3. A process for introducing calcium carbonate into conventional carbonaceous brush stock which comprises placing said brush stock under a pressure less than atmospheric, immersing said brush stock in an aqueous solution of calcium nitrate while said brush stock is under said sub-atmospheric pressure, subjecting said brush stock while it is immersed in said solution to at least atmospheric pressure, drying said brush stock, and heating said brush stock to a temperature of about 650° C. to convert the calcium nitrate in said brush stock to calcium carbonate.

References Cited in the file of this patent

UNITED STATES PATENTS

| Number | Name | Date |
|---|---|---|
| 2,445,003 | Ramadanoff | July 13, 1948 |
| 2,512,362 | Moberly | June 20, 1950 |
| 2,530,984 | Moberly | Nov. 21, 1950 |